(12) United States Patent
Kim et al.

(10) Patent No.: US 11,358,464 B2
(45) Date of Patent: Jun. 14, 2022

(54) COOLING SYSTEM OF ELECTRIC POWER SYSTEM FOR VEHICLE

(71) Applicants: Hyundai Motor Company, Seoul (KR); Kia Motors Corporation, Seoul (KR)

(72) Inventors: Ju Hee Kim, Janghang-eup (KR); Moon Jo Kang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 30 days.

(21) Appl. No.: 17/030,750

(22) Filed: Sep. 24, 2020

(65) Prior Publication Data

US 2021/0323396 A1   Oct. 21, 2021

(30) Foreign Application Priority Data

Apr. 20, 2020   (KR) .................. 10-2020-0047551

(51) Int. Cl.
| | | |
|---|---|---|
| *B60K 11/02* | (2006.01) | |
| *B60L 53/00* | (2019.01) | |
| *B60K 1/04* | (2019.01) | |
| *B60K 1/00* | (2006.01) | |

(52) U.S. Cl.
CPC ............ *B60K 11/02* (2013.01); *B60K 1/00* (2013.01); *B60K 1/04* (2013.01); *B60L 53/00* (2019.02)

(58) Field of Classification Search
CPC ..... B60K 11/02; B60H 1/00278; B60L 58/26; B60W 10/30
See application file for complete search history.

(56) References Cited

U.S. PATENT DOCUMENTS

| | | | | |
|---|---|---|---|---|
| 6,138,466 | A | * | 10/2000 | Lake ................. B60H 1/00392 62/238.7 |
| 2005/0133215 | A1 | * | 6/2005 | Ziehr ..................... F25B 41/24 62/238.7 |
| 2016/0229282 | A1 | * | 8/2016 | Hettrich ................. B60K 11/02 |
| 2017/0016206 | A1 | * | 1/2017 | Ota ......................... E02F 9/0858 |
| 2017/0226715 | A1 | * | 8/2017 | Ota ......................... B60K 11/04 |
| 2019/0263252 | A1 | * | 8/2019 | Hettrich ................. B60L 58/27 |
| 2020/0031250 | A1 | * | 1/2020 | Yuan .................. H01M 10/617 |
| 2021/0023906 | A1 | * | 1/2021 | Crivellari ........... B60H 1/00278 |
| 2021/0062467 | A1 | * | 3/2021 | Watanabe ........... H01M 10/613 |
| 2021/0221254 | A1 | * | 7/2021 | Abe ......................... B60L 53/14 |
| 2021/0323396 | A1 | * | 10/2021 | Kim ........................ B60L 58/27 |
| 2022/0055454 | A1 | * | 2/2022 | Lee ................... H01M 10/6568 |
| 2022/0074337 | A1 | * | 3/2022 | Ariyama ............... B60K 11/04 |

FOREIGN PATENT DOCUMENTS

| | | | |
|---|---|---|---|
| KR | 10-2014-0048359 | A | 4/2014 |
| KR | 10-2016-0003148 | A | 1/2016 |

* cited by examiner

*Primary Examiner* — Jeffrey J Restifo
(74) *Attorney, Agent, or Firm* — Morgan, Lewis & Bockius LLP

(57) ABSTRACT

Disclosed is a cooling system for an electric power system for a vehicle capable of selectively cooling a power component used while the vehicle travels or is charged.

7 Claims, 4 Drawing Sheets

COOLING SYSTEM OF ELECTRIC POWER SYSTEM FOR VEHICLE

CROSS REFERENCE TO RELATED APPLICATION

The present application claims priority to Korean Patent Application No. 10-2020-0047551 filed on Apr. 20, 2020, the entire contents of which is incorporated herein for all purposes by this reference.

BACKGROUND OF THE PRESENT INVENTION

Field of the Invention

The present invention relates to a cooling system for an electric power system for a vehicle, and more particularly, to a cooling system for an electric power system for a vehicle capable of selectively cooling a power component used while the vehicle travels or is charged.

Description of Related Art

As problems such as global warming and environmental pollution have emerged seriously, research and development of eco-friendly vehicles configured for maximally reducing environmental pollution is actively conducted in the vehicle industry field and the market thereof is gradually expanding.

As the eco-friendly vehicle, an electric vehicle, a hybrid vehicle, and a plug-in hybrid vehicle which apply an electric motor generating a driving force using electrical energy instead of an engine which generates the driving force by combusting conventional fossil fuel are being released worldwide. Among the eco-friendly vehicles using the electrical energy, the electric vehicle and the plug-in hybrid vehicle receive power from an external charging facility connected to a grid to charge a battery provided in the vehicle, and use the power components to convert the power charged in the battery to provide it to a motor, producing kinetic energy required to drive the vehicle.

The battery provided in the eco-friendly vehicle and power components which convert the stored energy of the battery generate a lot of heat during operation and if the heat is generated, there are problems in that the performance of the components is degraded and endurance deteriorates, so that to prevent the battery and the power components from exceeding a proper temperature to generate heat, a water cooling system in which coolant is supplied to cool the battery and the power components is introduced.

A conventional water cooling system performs cooling by a method for driving a water pump configured for circulating coolant to a cooling passage to dispose the overall cooling targets in one passage. Accordingly, coolant is also supplied to an on-board charger (OBC) which does not operate while the vehicle travels, and coolant is also supplied to a motor or an inverter which does not operate while the vehicle is charged.

Since such a conventional water cooling system uniformly circulates coolant regardless of the operation states of various components to be cooled, a high performance large water pump is applied in consideration of the cooling load for all components.

Accordingly, there are problems in that the conventional cooling system is disadvantageous in terms of a vehicle package design due to the increase in the volume of the water pump, and the power consumption is increased by the operation of the water pump, reducing fuel efficiency.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cooling system of an electric power system for a vehicle, which may classify cooling target power components which do not operate mutually, simultaneously due to the operation characteristics of a vehicle to dispose them in different cooling passages, and selectively supply coolant to a cooling passage in which power components required for cooling are provided according to the operation state of the vehicle, reducing the size of a water pump and improving cooling efficiency.

As a means for achieving the object, various aspects of the present invention provide a cooling system of an electric power system for a vehicle including: a first passage connecting a driver motor and an inverter, wherein a coolant flows through the first passage to supply the coolant to at least one of the drive motor generating power of the vehicle and the inverter converting energy stored in a battery in the vehicle to supply the energy to the drive motor; a second passage connecting an on-board charger and having a first end connected to the first passage and through which the coolant flows to supply the coolant to the on-board charger supplying charging power to the battery electrically-connected to the on-board charger; a water pump connected to the first passage and the second passage, respectively, and changing a flow direction of the coolant in a bidirectional rotation of the pump; a first unidirectional valve mounted on the first passage to allow the coolant to flow in the first passage only in one direction of a direction toward a connection point of the first passage and the second passage and a direction toward the water pump; a second unidirectional valve mounted on the second passage to allow the coolant to flow in the second passage in only a direction opposite to the direction allowed by the first unidirectional valve; and a controller electrically-connected to the pump and configured of changing the rotation direction of the water pump according to whether the vehicle travels or is charged to allow the coolant to flow through one of the first passage and the second passage.

In various exemplary embodiments of the present invention, the water pump may have a first outlet/inlet connected to one end of the first passage, a second outlet/inlet connected to a second end of the second passage, and a third outlet/inlet, and the cooling system of the electric power system for the vehicle may further include: a third passage connected between the third outlet/inlet and the connection point to allow the coolant to flow through the third passage.

In the exemplary embodiment of the present invention, the cooling system of the electric power system for the vehicle may further include: a cooler mounted on the third passage to cool the coolant flowing through the third passage.

In the exemplary embodiment of the present invention, the battery may be mounted on the third passage to receive the coolant flowing through the third passage.

In the exemplary embodiment of the present invention, the first outlet/inlet and the second outlet/inlet may be provided to introduce fluid when the water pump is rotated in a first rotation direction among the bidirectional rotation of the pump, and to discharge the fluid when the water pump is rotated in a second rotation direction which is a direction opposite to the first rotation direction thereof, and the third outlet/inlet may be provided to discharge the fluid when the water pump is rotated in the first rotation direction thereof, and to introduce the fluid when the water pump is rotated in the second rotation direction thereof.

In the exemplary embodiment of the present invention, the controller may be configured to determine the rotation direction of the water pump so that the coolant flows through the second passage when the power of the on-board charger is in an ON state, and determine the rotation direction of the water pump so that the coolant flows through the first passage when the power of the on-board charger is in an OFF state and a startup of the vehicle is in an ON state.

As another means for achieving the object, various aspects of the present invention provide a cooling system of an electric power system for a vehicle including: a first passage connecting a driver motor and an inverter, wherein a coolant flows through the first passage to supply the coolant to at least one of the drive motor generating power of the vehicle and the inverter converting energy stored in a battery in the vehicle to supply the energy to the drive motor; a second passage connecting an on-board charger and having a first end connected to the first passage and through which the coolant flows to supply the coolant to the on-board charger supplying charging power to the battery electrically-connected to the on-board charger; a water pump having a first outlet connected to one end of the first passage, a second outlet connected to a second end of the second passage, and an inlet, and allowing the coolant provided to the inlet according to a rotation direction of the pump to selectively flow through one of the first outlet and the second outlet; a third passage connected between the inlet and the connection point and through which the coolant flows; and a controller electrically-connected to the pump and configured of changing the rotation direction of the water pump according to whether the vehicle travels/is charged.

In various exemplary embodiments of the present invention, the controller may be configured to determine the rotation direction of the water pump so that the coolant flows through the second passage when the power of the on-board charger is in an ON state, and determine the rotation direction of the water pump so that the coolant flows through the first passage when the power of the on-board charger is in an OFF state and a startup of the vehicle is in an ON state.

The cooling system of the electric power system for the vehicle may classify the power components operating according to the traveling/charging state of the vehicle to dispose them in the different cooling passages, and supply the coolant only to the cooling passage disposed in the power component operating according to whether the vehicle actually travels and is charged, applying the water pump with a smaller size than that of the water pump provided to circulate the coolant on the cooling passage configured to cool the overall components at once.

Accordingly, the cooling system of the electric power system for the vehicle may reduce the volume of the water pump, improving the degree of freedom of the vehicle package design, and reduce the cost of the water pump itself and reduce the power consumed by the water pump, improving fuel efficiency.

The effects obtainable in various exemplary embodiments of the present invention are not limited to the aforementioned effects, and other effects not mentioned may be clearly understood by those skilled in the art to which various exemplary embodiments of the present invention pertains from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
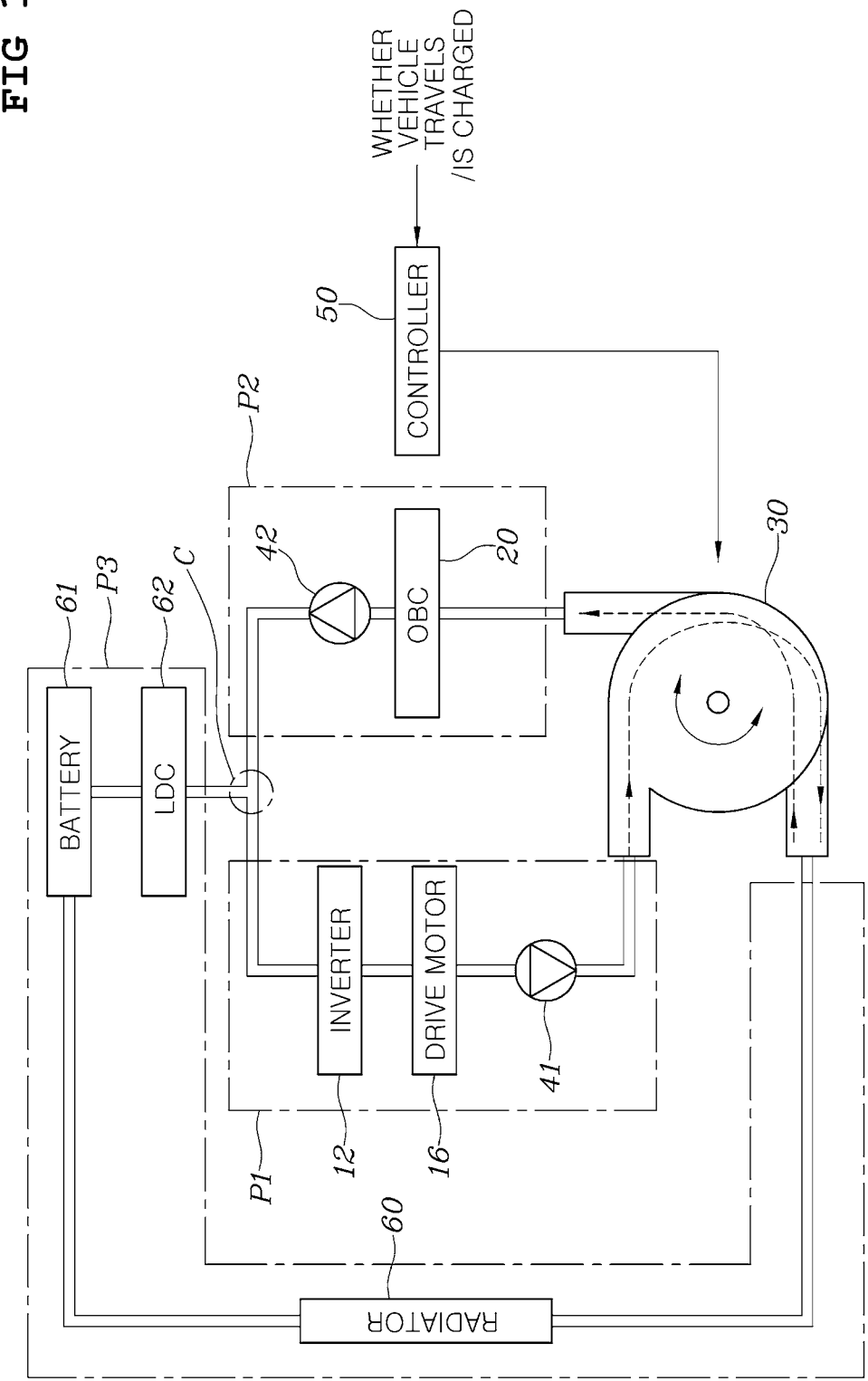
FIG. 1 is a block diagram illustrating a cooling system of an electric power system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a cooling system of an electric power system for a vehicle according to various exemplary embodiments of the present invention will be described in more detail with reference to the accompanying drawings.

FIG. 1 is a block diagram illustrating a cooling system of an electric power system for a vehicle according to various exemplary embodiments of the present invention.

Referring to FIG. 1, a cooling system for an electric power system for a vehicle according to various exemplary embodiments of the present invention may include a first passage P1 through which a coolant flows to supply the coolant to at least one of a drive motor 16 which generates power of a vehicle and an inverter 12 which converts energy stored in a battery 61 in the vehicle to supply the energy to the drive motor 16, a second passage P2 which has one end connected to the first passage P1 and through which the coolant flows to supply the coolant to an on-board charger supplying charge power to the battery 61, a water pump 30 connected to the first passage P1 and the second passage P2, respectively, and changing a direction of the coolant flow by the bidirectional rotation, a first unidirectional valve 41 mounted on the first passage P1, and allowing the coolant to flow within the first passage P1 only in one direction of a direction toward a connection point C between the first passage P1 and the second passage P2 and a direction toward the water pump 30, a second unidirectional valve 42 mounted on the second passage P2 and allowing the coolant to flow within the second passage P2 in only a direction opposite to the direction allowed by the first unidirectional valve 41, and a controller 50 changing the rotation direction of the water pump 30 according to whether the vehicle travels or is charged to allow the coolant to flow only through one passage of the first passage P1 and the second passage P2.

The first passage P1 may have one end connected to the second passage P2 at the connection point C and the other end connected to the water pump 30.

On the first passage P1, the drive motor 16 which provides power to a vehicle wheel as a cooling target and the inverter 12 which converts energy stored in the battery to provide it to the drive motor 16 may be mounted. The inverter 12 may be expressed as a hybrid power control unit (HPCU) including a power conversion semiconductor device in which heat is generated.

The drive motor 16 generates a rotational force through the interaction between the magnetic field of a stator formed by the provided multi-phase AC power and the magnetic field of a permanent magnet provided in a rotor and heat is generated by loss, and the inverter 12 or a hybrid power control unit is an element which converts energy stored in the battery 61 through switching of the power conversion semiconductor devices to provide it to the drive motor 16 of the vehicle and may generate a lot of heat in the switching process for power conversion.

The cooling target mounted on the first passage P1 is a component which operates when the vehicle travels and coolant may be supplied to the first passage P1 when the vehicle travels through a control of the rotation direction of the motor 30.

The second passage P2 may have one end connected to the first passage P1 at the connection point C and the other end connected to the water pump 30.

On the second passage P2, an on-board charger (OBC) 20 which supplies charging power for charging the battery 61 may be mounted.

The on-board charger 20 does not operate while the vehicle travels and may operate to convert the power provided by a charging facility into the charging power suitable for charging the battery 61 to supply it to the battery 61 if the traveling of the vehicle terminates and the charging facility is connected to the vehicle.

The first unidirectional valve 41 may be mounted on the first passage P1 to enable the coolant on the first passage P1 to flow only in one direction thereof, and the second unidirectional valve 42 may be mounted on the second passage P2 to enable the coolant on the second passage P2 to flow only in one direction thereof. The first unidirectional valve 41 and the second unidirectional valve 42 may also use valves in which the opening/closing thereof is controlled through a separate control to form the coolant flow only in one direction according to the rotation direction of the water pump 30 but may be preferably implemented with a check valve which does not require a separate control.

FIG. 1 illustrates an example in which the first unidirectional valve 41 mounted on the first passage P1 allows the fluid flow in the first passage P1 in only the direction toward the water pump 30, and the second unidirectional valve 42 mounted on the second passage P2 allows the fluid flow in only the direction opposite to the direction toward the water pump 30.

The water pump 30 may use a bidirectional water pump which may control the coolant flow by adjusting the rotation direction thereof.

The water pump 30 may have a plurality of outlets/inlets, and form the selective flow of the coolant of the first passage P1 and the second passage P2 connected to the outlets/inlets, respectively based on the rotation direction of the water pump 30 and the directions of the coolant flows determined by the first unidirectional valve 41 and the second unidirectional valve 42.

In the exemplary embodiment of FIG. 1, the water pump 30 may have three outlets/inlets: a first outlet/inlet may be connected to the first passage P1 and a second outlet/inlet may be connected to the second passage P2. Furthermore, the third outlet/inlet of the water pump 30 may be connected to a third passage P3.

The third passage P3 is a coolant passage between the water pump 30 and the connection point C of the first passage P1 and the second passage P2. A cooler configured for reducing the temperature of the coolant by cooling the coolant circulating through the passage may be mounted on the third passage P3. For example, the cooler may be a radiator 60. Furthermore, on the third passage P3, the battery 61 which generates heat when the vehicle travels and is charged may be mounted, and a low voltage DC-DC converter (LDC) 62 which converts the voltage of the battery 61 at a low voltage which is lower than a predetermined voltage may also be mounted.

The controller 50 may control the rotation direction of the water pump 30 according to whether the vehicle travels/is charged. For example, since the on-board charger 20 of the vehicle operates only when the vehicle is charged, the on-board charger 20 may control the rotation direction of the water pump 30 according to the power state of the on-board charger 20.

Figure 2:
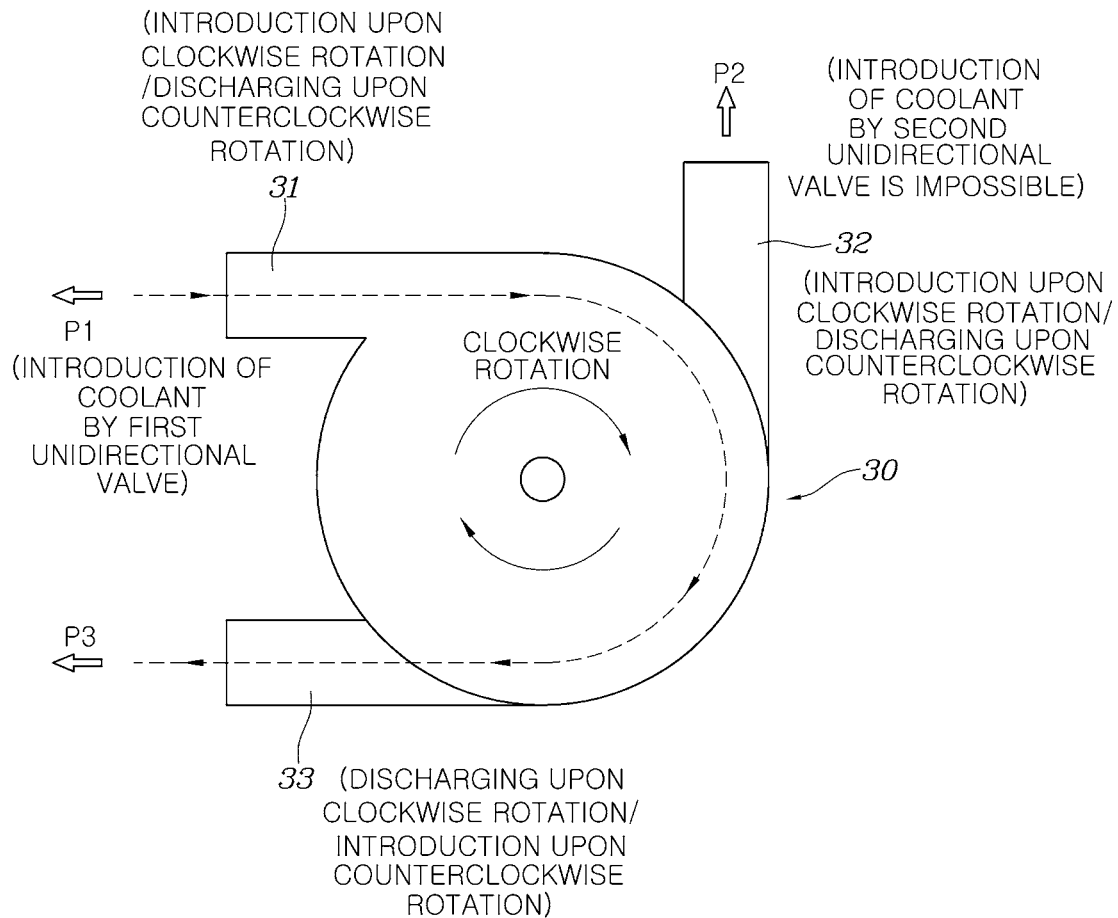
FIG. 2 and FIG. 3 are diagrams explaining various operation examples of a pump used in the electric power system for the vehicle according to the exemplary embodiment of the present invention.
Figure 3:
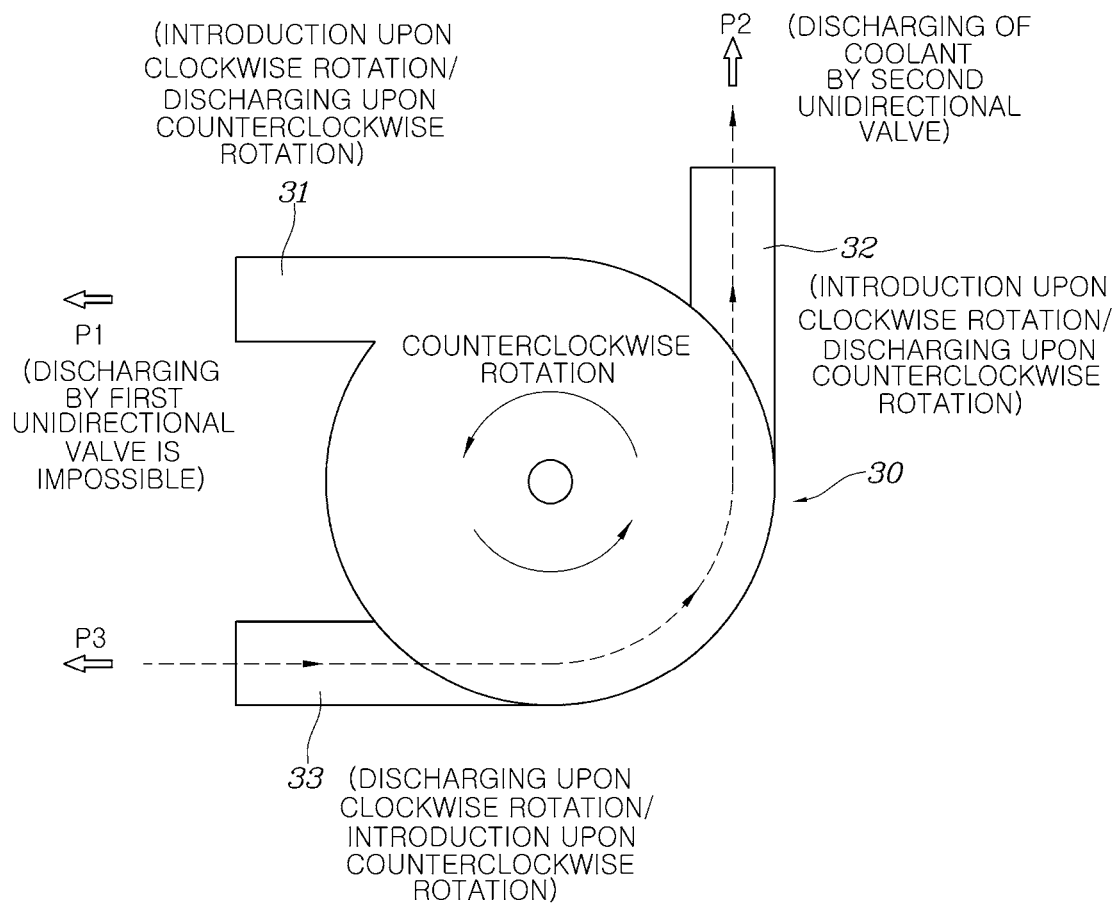

FIG. 2 and FIG. 3 are diagrams explaining various operation examples of the pump used in the electric power system for the vehicle according to the exemplary embodiment of the present invention.

The water pump 30 illustrated in FIG. 2 and FIG. 3 may have three outlets/inlets 31 to 33. The first outlet/inlet 31 and the second outlet/inlet 32 may be formed in a structure which introduces fluid when the water pump 30 rotates clockwise, and discharge the fluid when the water pump rotates counterclockwise. Furthermore, the third outlet/inlet 33 may be formed in a structure which discharges the fluid when the water pump 30 rotates clockwise, and introduces the fluid when the water pump 30 rotates counterclockwise.

If the water pump illustrated in FIG. 2 and FIG. 3 is applied to the exemplary embodiment illustrated in FIG. 1, the controller 50 determines that the vehicle is in a traveling state when the power of the on-board charger 20 of the vehicle is in the OFF state and a startup of the vehicle is in an ON state and as illustrated in FIG. 2, rotates the water pump 30 clockwise to circulate the coolant.

In the instant case, since the first unidirectional valve 41 mounted on the first passage P1 allows the fluid flow in the first passage P1 in only the direction toward the water pump 30, the coolant is introduced into the first outlet/inlet 31 connected to the first passage P1 when the water pump 30 rotates clockwise and the introduced coolant may be discharged to the third outlet/inlet 33. Since the second unidirectional valve 42 mounted on the second passage P2 allows the fluid flow in only the direction opposite to the direction toward the water pump 30, the coolant is not introduced when the water pump 30 is rotated clockwise and a pressure which may discharge the coolant in the direction of the fluid flow in the water pump 30 is not formed, so that the coolant flow does not occur in the second passage P2.

Furthermore, as illustrated in FIG. 3, when the power of the on-board charger 20 of the vehicle is in the ON state, the controller 50 rotates the water pump 30 counterclockwise to enable the circulation of coolant.

In the instant case, since the first unidirectional valve 41 mounted on the first passage P1 allows the fluid flow in the first passage P1 in only the direction toward the water pump 30, the coolant is not introduced when the water pump 30 is rotated counterclockwise. Since the second unidirectional valve 42 mounted on the second passage P2 allows the fluid flow in only the direction opposite to the water pump 30, the coolant introduced through the third outlet/inlet 33 is discharged through the second outlet/inlet 32 to allow the coolant to flow to the on-board charger 20.

Although not illustrated, if the fluid flows allowed by the unidirectional valves mounted on the respective passages P1, P2 are opposite to that illustrated in FIG. 1, the coolant supply passages according to the rotation direction of the water pump 30 illustrated in FIG. 2 and FIG. 3 are interchanged in the example illustrated in FIG. 1. That is, if the unidirectional valve mounted on the second passage P2 allows the fluid flow in only the direction toward the water pump 30 if the unidirectional valve mounted on the first passage P1 allows the fluid flow in only the direction opposite to the direction toward the water pump 30, the coolant is introduced into the second outlet/inlet 32 connected to the second passage P2 and the coolant is discharged to the third outlet/inlet 33 to enable the circulation of the coolant when the water pump 30 is rotated clockwise as illustrated in FIG. 2. Furthermore, when the water pump 30 is rotated counterclockwise as illustrated in FIG. 3, the coolant introduced into the third outlet/inlet 33 is discharged to the first outlet/inlet 31 connected to the first passage P1 to enable the circulation of the coolant.

Figure 4:
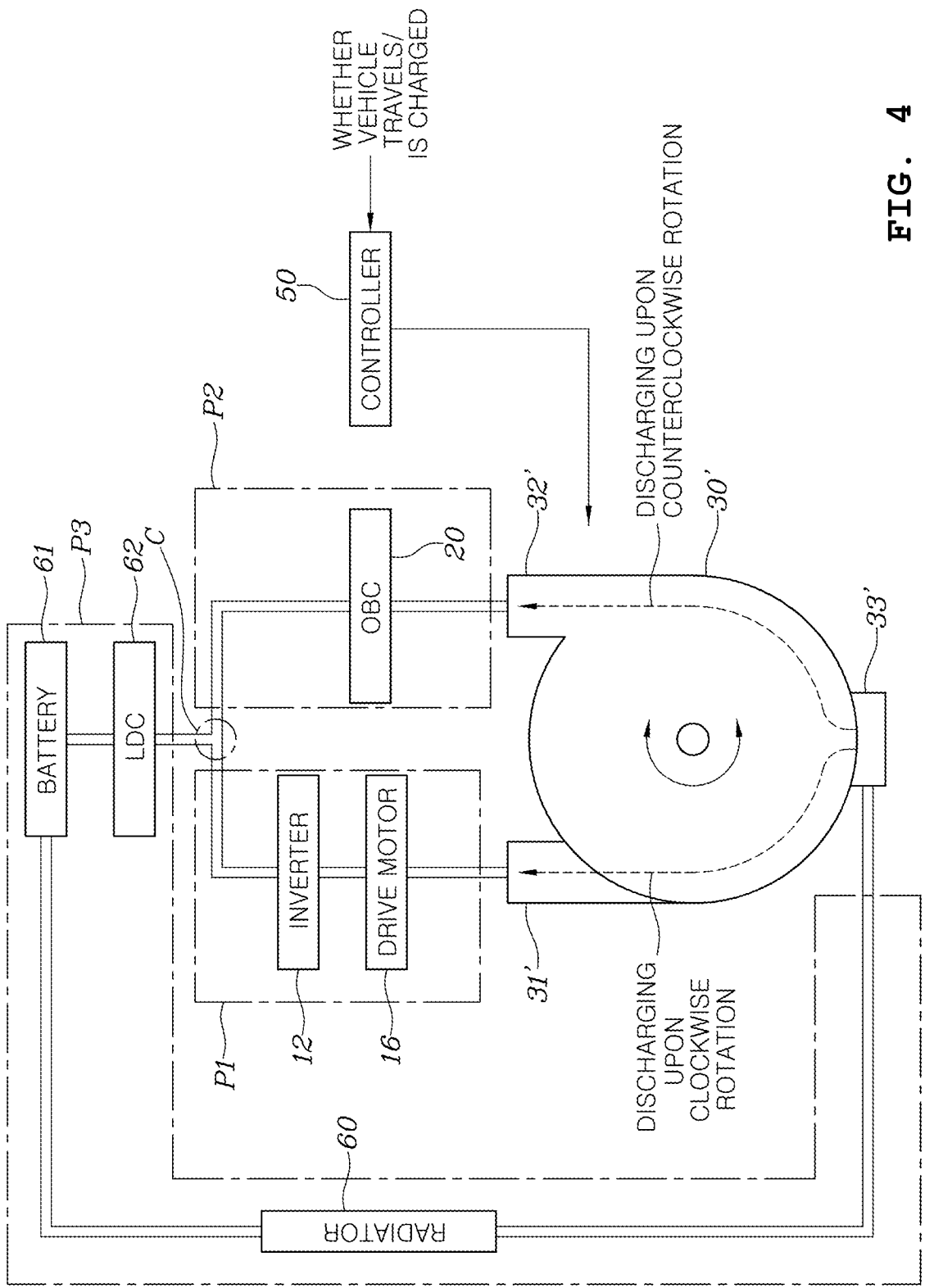
FIG. 4 is a block diagram illustrating a cooling system of an electric power system for a vehicle according to various exemplary embodiments of the present invention.

FIG. 4 is a block diagram illustrating a cooling system of an electric power system for a vehicle according to various exemplary embodiments of the present invention.

An exemplary embodiment illustrated in FIG. 4 is an example in which the overall coolant circulation directions of the cooling system are formed in one direction unlike the exemplary embodiment illustrated in FIG. 1. That is, in the exemplary embodiment illustrated in FIG. 1, if the rotation direction of the water pump 30 is clockwise, the overall coolant circulation directions of the cooling system may become clockwise, and if the rotation direction of the water pump 30 is counterclockwise, the overall coolant circulation directions of the cooling system may become counterclockwise, but in the exemplary embodiment illustrated in FIG. 4, the overall coolant circulation directions of the cooling system may become counterclockwise regardless of the rotation direction of a water pump 30'.

This is caused by a structural difference in the water pump 30', and the water pump 30' applied to the exemplary embodiment illustrated in FIG. 4 is the water pump 30' including two outlets 31', 32' and one inlet 33', and the coolant introduced into the inlet 33' connected to the third passage P3 is discharged to a first outlet 21' to allow the coolant to flow through the first passage P1 when the water pump 30' is rotated clockwise. Conversely, when the water pump 30' is rotated counterclockwise, the coolant introduced into the inlet 33' connected to the third passage P3 is discharged to the second outlet 22' to allow the coolant to flow through the second passage P2.

In the exemplary embodiment illustrated in FIG. 4, if the water pump 30' is rotated clockwise, the coolant introduced from the inlet 33' is discharged to a first outlet 31' and not discharged to a second outlet 32' due to the insufficient water pressure which may discharge the coolant. Furthermore, if the water pump 30' is rotated counterclockwise, the coolant introduced from the inlet 33' is discharged to the second outlet 32' and not discharged to the first outlet 32' due to the insufficient water pressure which may discharge the coolant.

The exemplary embodiment illustrated in FIG. 4 utilizes the water pump 30' having a suitable structure and thus may omit two unidirectional valves compared to the exemplary embodiment illustrated in FIG. 1, being further suitable for reducing the size of the system and reducing the cost.

Of course, if the power of the on-board charger 20 is in the OFF state and a startup of the vehicle is in an ON state, the controller 50 may rotate the water pump 30' clockwise so that the coolant may flow through the first passage P1 on which the drive motor 16 and the inverter 12 are mounted, and if the power of the on-board charger 20 is in the ON state, the controller 50 may rotate the water pump 30' counterclockwise so that the coolant may flow through the second passage P2 on which the on-board charger 20 is mounted.

Since the outlet/inlet, outlet, and inlet structures for implementing the discharge/introduction of the fluid made performed in the water pumps 30, 30' illustrated in FIG. 1, FIG. 2, FIG. 3, and FIG. 4 are already known in the art, additional detailed descriptions will be omitted. Furthermore, the rotation of the water pump means the rotation of the motor provided to rotate an impeller applied to the water pump or the like to generate the fluid flow, which is an expression already commonly used in the art.

As described above, the cooling system of the electric power system for the vehicle according to various exemplary embodiments of the present invention may selectively cool the cooling targets appropriately for the vehicle traveling/charging state by simply changing the rotation direction of the water pump, not requiring the high performance water pump. Accordingly, it is possible to reduce the size of the water pump itself, miniaturizing the entire cooling system and reducing the system cost.

The cooling system of the electric power system for the vehicle according to various exemplary embodiments of the present invention does not require the expensive three-way valve or the like when the cooling passage for selective cooling is branched and may selectively determine the passage of the coolant through a control of the inexpensive unidirectional valve (the check valve) and the water pump or only a control of the water pump, further increasing an effect of the cost saving.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling system of an electric power system for a vehicle, the cooling system comprising:
   a first passage connecting a driver motor and an inverter, wherein a coolant flows through the first passage to supply the coolant to at least one of the drive motor generating power of the vehicle and the inverter converting energy stored in a battery in the vehicle to supply the energy to the drive motor;
   a second passage connecting an on-board charger and having a first end connected to the first passage and through which the coolant flows to supply the coolant to the on-board charger supplying charging power to the battery electrically-connected to the on-board charger;
   a pump connected to the first passage and the second passage, respectively, and changing a flow direction of the coolant in a bidirectional rotation of the pump;
   a first unidirectional valve mounted on the first passage to allow the coolant to flow in the first passage only in one direction of a direction toward a connection point of the first passage and the second passage and a direction toward the pump;
   a second unidirectional valve mounted on the second passage to allow the coolant to flow in the second passage in only a direction opposite to the direction allowed by the first unidirectional valve; and
   a controller electrically-connected to the pump and configured of changing a rotation direction of the pump according to whether the vehicle travels or is charged to allow the coolant to flow through one of the first passage and the second passage.

2. The cooling system of claim 1,
   wherein the pump has a first outlet/inlet connected to one end of the first passage, a second outlet/inlet connected to a second end of the second passage, and a third outlet/inlet, and
   wherein the cooling system further includes a third passage connected between the third outlet/inlet and the connection point to allow the coolant to flow through the third passage.

3. The cooling system of claim 2, further including:
   a cooler mounted on the third passage to cool the coolant flowing through the third passage.

4. The cooling system of claim 2,
   wherein the battery is mounted on the third passage to receive the coolant flowing through the third passage.

5. The cooling system of claim 2,
   wherein the first outlet/inlet and the second outlet/inlet are provided to introduce a fluid when the pump is rotated in a first rotation direction among the bidirectional rotation of the pump, and to discharge the fluid when the pump is rotated in a second rotation direction among the bidirectional rotation of the pump, the second rotation direction being a direction opposite to the first rotation direction, and
   wherein the third outlet/inlet is provided to discharge the fluid from the third outlet/inlet when the pump is rotated in the first rotation direction, and to introduce the fluid into the third outlet/inlet when the pump is rotated in the second rotation direction.

6. The cooling system of claim 1,
   wherein the controller is configured to determine the rotation direction of the pump so that the coolant flows through the second passage when the charging power of the on-board charger is in an ON state.

7. The cooling system of claim 1,
   wherein the controller is configured to determine the rotation direction of the pump so that the coolant flows through the first passage when the charging power of the on-board charger is in an OFF state and a startup of the vehicle is in an ON state.

* * * * *